Aug. 2, 1927.
W. R. LARTER
1,637,698
CORD ATTACHING DEVICE
Filed Feb. 1, 1926
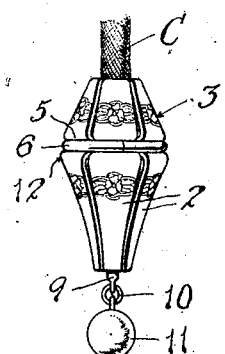
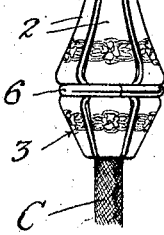
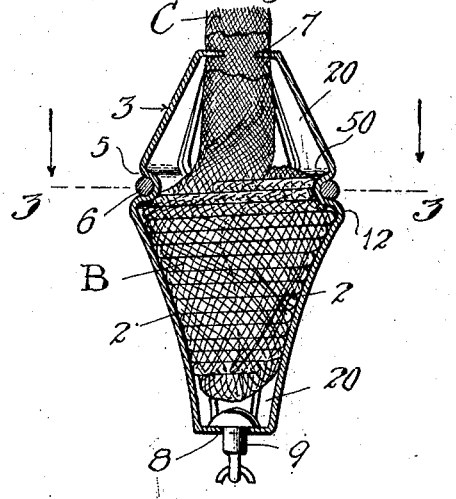
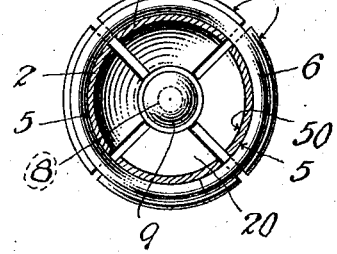
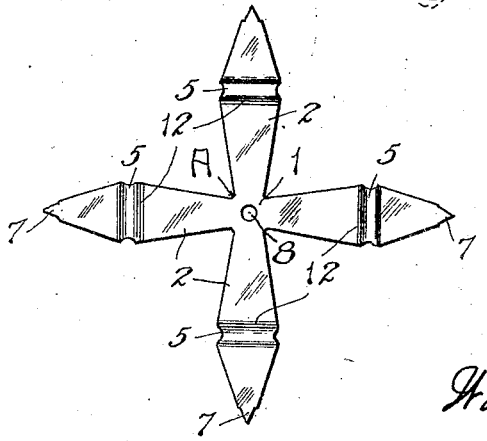
INVENTOR
Warren R. Larter,
BY
Everett H. Hook,
ATTORNEYS Patented Aug. 2, 1927.

1,637,698

UNITED STATES PATENT OFFICE.

WARREN R. LARTER, OF NEWARK, NEW JERSEY, ASSIGNOR TO LARTER & SONS, OF NEWARK, NEW JERSEY, A FIRM.

CORD-ATTACHING DEVICE.

Application filed February 1, 1926. Serial No. 85,342.

This invention relates in general to a device for connecting a cord, braid, or the like to another article, device or support, for example for connecting a silken cord or braid to a watch chain swivel, hook, charm or the like.

One object of the invention is to provide a device of the character described embodying novel and improved features of construction whereby a secure attachment of the cord to another article or device is obtained and wherein the attached end of the cord is entirely encased to provide an attractive and pleasing appearance.

Other objects are to provide such a device the body of which may be conveniently formed of sheet metal and which includes simple means for clamping the end of a cord or the like in said body portion, so that the construction is simple and inexpensive; to provide a cord attaching device having a body formed of sheet metal and including a plurality of arms forming a split socket to receive a knotted end of a cord or the like, and a clamping ring slidable exteriorly of said socket, the body being exteriorly tapered or gradually increasing in circumference inwardly from the open end of the socket and having a seat at the inner end of said taper to receive said clamping ring, whereby the arms of the body may be pressed together and into close contact with the cord by sliding of the ring from the end of the body into said seat; to form said seat by stamping or pressing the sheet metal of the body inwardly to form a rib on the interior of the socket so that said rib may serve as an abutment for the knotted or returned end of a cord to prevent the cord from pulling out of the socket when the arms of the body are in clamping position, and to obtain other results and advantages as may be brought out by the following description.

Referring to the accompanying drawings, in which corresponding and like parts are designated throughout the several views by the same reference characters, Figure 1 is a side elevation of a pair of cord attaching devices embodying the invention, showing the same as connecting two pieces of cord with a bead or jewel;

Figure 2 is a transverse vertical sectional view through the cord attaching device;

Figure 3 is a horizontal sectional view, taken on the line 3—3 of Figure 2, and

Figure 4 is a plan view of the blank from which the body portion of the cord attaching device is formed.

Specifically describing the illustrated embodiment of the invention the reference character A designates a blank of sheet metal which includes a central portion 1 and a plurality of radially projecting arms 2, said arms being so shaped that when they are swung inwardly together they form a body having a substantially closed split socket 20, as shown in Figure 2 of the drawings. The arms 2 are also preferably shaped and bent transversely so as to provide the socket in the form of two oppositely disposed frustums of hollow cones with the bases thereof arranged adjacent, whereby the socket may receive the knotted or returned end B of a cord C. The exterior surface of the body thus formed is gradually tapered or increases in circumference from the end of the socket, as indicated at 3, and at the inner end of the taper the arms 2 are formed with grooves 5 which together provide an annular groove or seat on the body to receive a clamping ring 6. These grooves are preferably stamped into the arms 2 so as to form corresponding ribs 50 on the insides of the arms which produce an annular rib within the socket. The clamping ring 6 is of a diameter somewhat greater than that of the ends of the body and less than the diameter of the annular groove or seat, and accordingly when the ring is slid longitudinally of the body from the open end of the socket into the annular seat, the arms 2 are forced inwardly toward each other. The extremities of the arms 2 are formed with prongs 7 to bite into a cord or the like when the arms are forced together.

In applying the device to a cord, the clamping ring 6 is removed from its seat and the end of the cord is preferably knotted or returned upon itself and sewed as at B, and inserted into the socket formed by the arms 2 with the whole or major part of the knot between the inner end of the socket and the ribs 50. The clamping ring is then slid longitudinally of the body from the open end of the socket into the seat, whereupon the arms 2 are forced together so that the prongs 7 bite into the cord and the ribs 50 form abutments for the knotted or returned end to prevent the latter from being pulled from the socket. The arms 2 thus serve in effect as clamping jaws and the cord is clamped by both the prongs 7 and the ribs 50. The opening between the extremities of the arms 2 is much smaller than the knot so that the cord cannot be pulled from the socket even should the ribs 50 and prongs 7 fail to grip the cord.

Shoulders 12 are provided at the sides of the grooves 5 most remote from the open end of the socket to prevent the clamping ring from being pushed beyond or out of the annular seat in the direction of the inner end of the socket, and also to protect the ring against accidental contact with exterior objects which might force the ring out of said seat in the other direction. These shoulders may be formed by the same stamping operation as the grooves 5.

Preferably the central portion of the body opposite the jaws 2 is formed with an opening 8 in which is rotatably mounted a swivel eye 9 to which may be attached articles or devices to be connected to the cord, for example the chain links 10 and a bead or jewel 11 as shown in Figure 1.

The metal of which the body is formed is preferably inherently resilient so that there is a normal tendency for the arms 2 to separate from each other when released by the clamping ring 6, and obviously to disconnect the device from the cord it is merely necessary to force the ring 6 out of its seat and slide it in the direction of the open end of the socket after which the knotted end of the cord may be pulled from between the ends of the jaws.

The body substantially wholly encases the knotted end of the cord to provide a neat appearance, and while the clamping ring 6 may be removed from the body, when it is arranged in the seat it is substantially fast upon the body and adds to the ornamental appearance thereof.

Having thus described the invention, what I claim is:

1. A device of the character described comprising a sheet metal body having a central portion and a plurality of integral radial arms which when swung inwardly of said central portion cooperate to form a split socket to receive and enclose an end of a cord or the like, said arms having transverse grooves cooperating to form an annular groove on the exterior of said body and said body being tapered and increasing in diameter from the open end of said socket to said groove, and a clamping ring of less diameter than said groove and slidable upon said tapered portion to seat in said groove and force and hold said arms together to clamp the end of a cord in said socket.

2. A device of the character described comprising a sheet metal body having a central portion and a plurality of radially projecting arms so shaped and arranged as to be swung inwardly of said central portion to form a split socket in the shape of two oppositely disposed frustums of hollow cones with their bases adjacent to receive a knotted or returned end of a cord or the like, said arms being provided with exterior transverse grooves to cooperate to form an annular groove on the exterior of said body, and a clamping ring to slide upon the exterior of said body and seat in said annular groove to force and hold said arms together.

WARREN R. LARTER.